United States Patent
Oami et al.

(10) Patent No.: US 8,306,992 B2
(45) Date of Patent: Nov. 6, 2012

(54) SYSTEM FOR DETERMINING CONTENT TOPICALITY, AND METHOD AND PROGRAM THEREOF

(75) Inventors: Ryoma Oami, Tokyo (JP); Kota Iwamoto, Tokyo (JP); Takami Sato, Tokyo (JP); Yasufumi Hirakawa, Tokyo (JP); Yuzo Senda, Tokyo (JP); Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/001,369

(22) PCT Filed: Jun. 16, 2009

(86) PCT No.: PCT/JP2009/060908
§ 371 (c)(1),
(2), (4) Date: Mar. 3, 2011

(87) PCT Pub. No.: WO2009/157339
PCT Pub. Date: Dec. 30, 2009

(65) Prior Publication Data
US 2011/0153609 A1    Jun. 23, 2011

(30) Foreign Application Priority Data
Jun. 26, 2008 (JP) ................................. 2008-167344

(51) Int. Cl.
*G06F 17/30* (2006.01)
(52) U.S. Cl. .......................... 707/768; 707/771
(58) Field of Classification Search .......... 707/765–775, 707/722–734, 748–763
See application file for complete search history.

(56) References Cited

U.S. PATENT DOCUMENTS

| | | | |
|---|---|---|---|
| 2002/0133506 A1 | 9/2002 | Yamato | |
| 2003/0105682 A1* | 6/2003 | Dicker et al. | 705/27 |
| 2005/0234953 A1* | 10/2005 | Zhang et al. | 707/101 |
| 2006/0015902 A1* | 1/2006 | Matsuura et al. | 725/46 |
| 2006/0047678 A1 | 3/2006 | Miyazaki et al. | |
| 2008/0250026 A1* | 10/2008 | Linden et al. | 707/10 |

FOREIGN PATENT DOCUMENTS

| | | |
|---|---|---|
| JP | 2002-279026 A | 9/2002 |
| JP | 2004-206679 A | 7/2004 |
| JP | 2005-236646 A | 9/2005 |
| JP | 2005-274991 A | 10/2005 |
| JP | 2005-333453 A | 12/2005 |
| JP | 2007-202054 A | 8/2007 |
| JP | 2007-272651 A | 10/2007 |

* cited by examiner

*Primary Examiner* — Wilson Lee
(74) *Attorney, Agent, or Firm* — Sughrue Mion, PLLC

(57) ABSTRACT

A system for determining content topicality comprises a feature value extracting means which extracts feature values of a plurality of contents from the contents; a content grouping means which compares the feature values of the plurality of contents extracted by the feature value extracting means, obtains identical contents and derived contents created using the contents, both of which are included in the plurality of contents, and groups the identical/derived contents, thereby computing identical/derived content grouping information; and a topicality determining means which totals viewing frequencies of the contents determined to be the identical/derived contents from viewing history information and the identical/derived content grouping information relating to the plurality of contents, computes total viewing frequencies of each of the identical/derived contents, and determines the topicality of the identical/derived contents according to the total viewing frequency.

17 Claims, 4 Drawing Sheets

SYSTEM FOR DETERMINING CONTENT TOPICALITY, AND METHOD AND PROGRAM THEREOF

CROSS REFERENCE TO RELATED APPLICATIONS

This application is a National Stage of International Application No. PCT/JP2009/060908 filed Jun. 16, 2009, claiming priority based on Japanese Patent Application No. 2008-167344 filed. Jun. 26, 2008, the contents of all of which are incorporated herein by reference in their entirety.

TECHNICAL FIELD

The present invention relates to a content topicality determination system, and a method and a program therefor.

BACKGROUND ART

Recently, many video hosting sites are rising, and the environment in which various videos can be viewed via Internet is being arranged. However, it is difficult to search out useful contents rich in the topicality because a large number of the video images are contributed. For this, when a viewing frequency representing an extent to which each content is viewed is grasped, the topicality can be determined from the viewing frequency.

One example of the system for distributing the contents over a network, and simultaneously therewith, measuring the viewing frequency is described in Patent Literature 1. In this system, a receiving terminal side thereof is provided with a means for measuring the viewing data, and when a user views the content that is distributed from a content server, the means measures its viewing data, and collectively transmits the viewing data and attribute information of the user to the content server. The content server collects the viewing data to be sent from the user, and calculates the viewing frequency data content by content.

However, employing the viewing frequency data as disclosed in JP-P2007-202054A and trying to determine the topicality of the contents causes a problem.

SUMMARY OF INVENTION

Technical Problem

A first controversial problem is that the topical contents cannot be correctly extracted based upon the viewing frequency disclosed in the Patent literature 1.

The reason is that the viewing frequency is calculated for each ID (identification information) for identifying the content. For this, the viewing frequency can be calculated only for each of individual contents when the ID management of the content is not accurately carried out and yet a plurality of IDs are given to the identical contents, or when the identical contents are distributed from a plurality of the video image sites each having a different policy of giving the content ID.

Thus, the user's viewing is dispersed all the more as the number of the IDs given to the identical contents is increased, which causes the viewing frequency of the content for each one identification ID to decline, and the viewing frequency to hardly reflects the topicality of the content accurately. Further, when the content that can be produced by derivation of a certain content exists (when one part of the video of a certain news content is utilized for other programs, or the like), the original content is included in the above derived content (there is not only the case that the original content is simply included therein, but also the case that the original content subjected to modifications to some extent such as character superimposition and a change in size/color of the image is included therein). As a result, the viewing of the derived content leads to the viewing as well of the original content.

Accordingly, in a case of determining the topicality, it is important to take the viewing frequency, which includes the viewing frequency as well of the derived content, into consideration.

Thereupon, the present invention has been accomplished in consideration of the above-mentioned problems, and an object thereof is to provide a content topicality determination system capable of adequately determining the topicality of the content, a method and a program therefor.

Solution to Problem

The present invention for solving the above-mentioned problems is a content topicality determination system including: a feature extraction means for extracting features of the contents from a plurality of the contents; a content grouping means for collating the features of a plurality of the contents extracted by the foregoing feature extraction means with each other, obtaining the identical contents and the derived contents produced by using the above identical contents to be included in the foregoing plurality of the contents, grouping the identical/derived contents, and calculating identical/derived content grouping information; and a topicality determination means for totaling viewing frequencies of the contents determined to be the identical/derived contents from viewing history information of the foregoing plurality of the contents and the foregoing identical/derived content grouping information, calculating a total viewing frequency for each identical/derived content, and determining the topicality of the foregoing identical/derived content based upon the foregoing total viewing frequency.

The present invention for solving the above-mentioned problems is a content topicality determination method including: a feature extraction step of extracting features of the contents from a plurality of the contents; a content grouping step of collating the features of the foregoing plurality of the extracted contents with each other, obtaining the identical contents and the derived contents produced by using the above identical contents to be included in the foregoing plurality of the contents, grouping the identical/derived contents, and calculating identical/derived content grouping information; and a topicality determination step of totaling viewing frequencies of the contents determined to be the identical/derived contents from viewing history information of the foregoing plurality of the contents and the foregoing identical/derived content grouping information, calculating a total viewing frequency for each identical/derived content, and determining the topicality of the foregoing identical/derived content based upon the foregoing total viewing frequency.

The present invention for solving the above-mentioned problems is a content topicality determination program for causing an information processing apparatus to execute: a feature extraction process of extracting features of the contents from a plurality of the contents; a content grouping process of collating the features of the foregoing plurality of the extracted contents with each other, obtaining the identical contents and the derived contents produced by using the above identical contents to be included in the foregoing plurality of the contents, grouping the identical/derived contents, and calculating identical/derived content grouping information; and a topicality determination process of totaling viewing frequencies of the contents determined to be the identical/derived contents from viewing history information of the foregoing plurality of the contents and the foregoing identical/derived content grouping information, calculating a total viewing frequency for each identical/derived content, and determining the topicality of the foregoing identical/derived content based upon the foregoing total viewing frequency.

Advantageous Effect of Invention

The present invention is capable of adequately determining the topicality of the content.

DESCRIPTION OF EMBODIMENTS

The content topicality determination system of this exemplary embodiment includes: a feature extraction means (100 of FIG. 1) for extracting the features of the contents from a plurality of the contents; a content grouping means (101 of FIG. 1) for collating the features of a plurality of the contents extracted by the feature extraction means with each other, obtaining the identical contents and the derived contents produced by using the above identical contents to be included in a plurality of the contents, grouping the identical/derived contents, and calculating identical/derived content grouping information; and a topicality determination means (102 of FIG. 1) for totaling viewing frequencies of the contents determined to be the identical/derived contents from viewing history information of a plurality of the contents and the identical/derived content grouping information, calculating a total viewing frequency for each identical/derived content, and determining the topicality of the foregoing identical/derived content based upon the total viewing frequency.

Also when a plurality of different IDs are given to the identical contents, or when the above content is employed as one part of the other contents, the content topicality determination system configured in such a manner allows these contents to be grouped and the viewing frequency to be calculated for the group. Determining the topicality based upon this viewing frequency makes it possible to precisely determine the topicality of the content, and accomplish an object of the present invention also when a plurality of different IDs are given to the identical contents, or when the above content is employed as one part of the other contents.

Next, the exemplary embodiment of the present invention will be explained in details by making a reference to the accompanied drawings.

Figure 1:
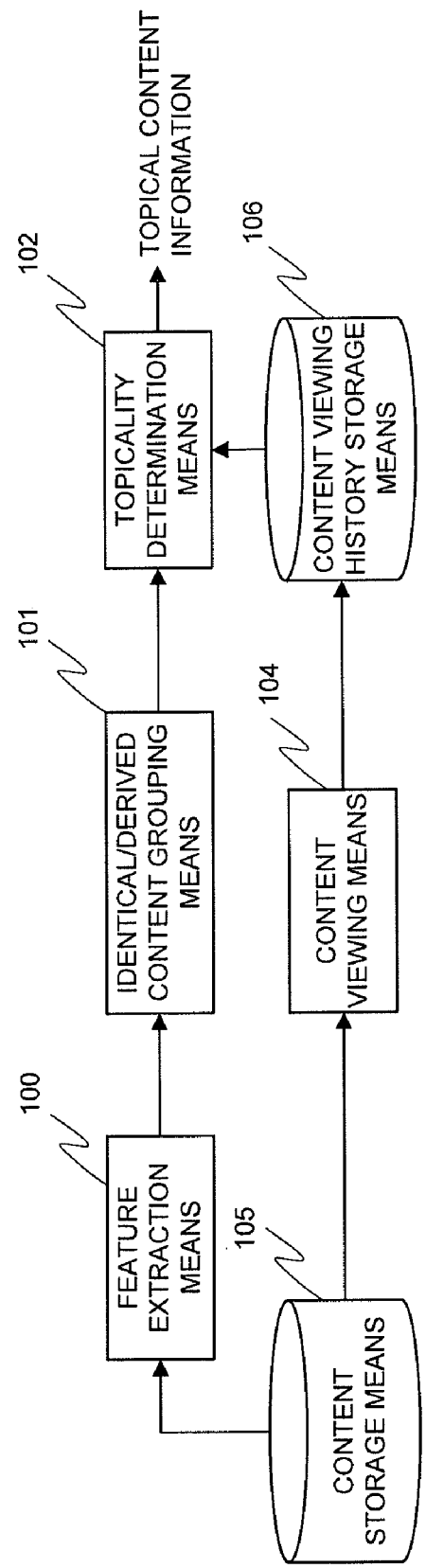
FIG. 1 is a block diagram illustrating a configuration of the content topicality determination system in an exemplary embodiment of the present invention.

FIG. 1 is a view illustrating the content topicality determination system in this exemplary embodiment of the present invention. Upon making a reference to FIG. 1, the content topicality determination system in this exemplary embodiment is configured of a feature extraction means 100, an identical/derived content grouping means 101, a topicality determination means 102, a content viewing means 104, a content storage means 105, and a content viewing history storage means 106.

The content storage means 105, which stores a plurality of the contents, is connected to the feature extraction means 100 and the content viewing means 104. The feature extraction means 100, into which the contents are inputted from the content storage means 105, obtains the features for the contents and outputs the features to the identical/derived content grouping means 101. The identical/derived content grouping means 101, into which the features to be outputted from the feature extraction means 100 are inputted, obtains content link information representing a link relation between the features, outputs it as grouping information to the topicality determination means 102. The topicality determination means 102, into which the grouping information is inputted from the identical/derived content grouping means 101, and the content viewing history information is inputted from the content viewing history storage means 106, respectively, generates and outputs topical content information. The content viewing means 104, into which the contents are inputted from the content storage means 105, outputs the viewing history information to the content viewing history storage means 106.

Next, an operation of the content topicality determination system shown in FIG. 1 will be explained.

The contents are stored in the content storage means 105. Herein, the so-called content refers to, for example, a digitalized multimedia content, and the digitalized picture, video and music, a combination thereof, and the like fall under the content. Additionally, the content could be not only a content produced by a professional such as a broadcast program, but also a so-called CGM (Consumer Generated Media), being a content produced by a consumer. Hereinafter, while the video image content is exemplified for explanation, the situation is similarly applicable to the music, the picture, and the like.

Further, while the content storage means 105 was explained in such a manner that the contents were stored in one location for convenience, the contents may be dispersedly stored in a plurality of the storages. For example, for a plurality of the video image hosting sites over Internet, the video images may be stored for each site. Further, also in each site, the contents may be dispersed and stored in a plurality of the storages. The contents stored in the content storage means 105 are inputted into the feature extraction means 100.

The feature extraction means 100 performs the feature extraction for each of the contents to be inputted. With the case of the picture, the feature is a visual feature such as color, pattern, and shape, and for example, the feature standardized by ISO/IEC 15938-3 can be employed. With the case of the music, the feature is an audio feature such as a power and a frequency component of sound, and for example, the feature standardized by ISO/IEC 15938-4 can be employed. With case of the video, besides the foregoing visual feature, the visual feature expressive of motion can be also employed, and for example, the feature standardized by ISO/IEC 15938-3 can be employed. Further, the foregoing audio feature may be employed, and both of the visual feature and the audio feature may be employed. The extracted feature of each of the contents is outputted to the identical/derived content grouping means 101.

The identical/derived content grouping means 101 collates the features of the contents to be inputted with each other, regards the contents of which the similarity between the features is large as contents each having identical details, and groups them. Specifically, the identical/derived content grouping means 101 calculates the similarity (or a distance) between the features of a certain two contents, and groups the above two contents when the similarity is equal to or more than a threshold (equal to or less than a threshold with the case of the distance).

Figure 2:
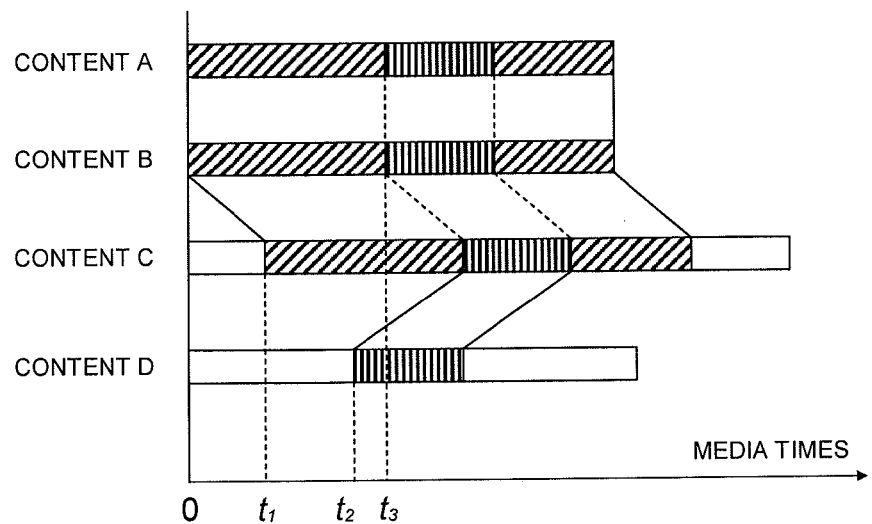
FIG. 2 is a view illustrating one example of grouping the contents each having a time axis.

With the case of the picture, comparing the entireties of the picture partners with each other and performing the similarity calculation at the moment of calculating the similarity makes it possible to group the identical pictures. Further, the similarity may be calculated by collating region partners of one part of the picture with each other. In this case, the other images that can be obtained by using a certain picture (for example, the images that can be obtained by framing the picture, and the image that can be obtained by affixing a certain picture to another picture), namely, the derived contents can be also grouped. On the other hand, with the case of the contents each having a time axis such as the video and the music, the identical/derived content grouping means 101 groups the contents in terms of each time section (a section length is arbitrary). For example, when it is assumed that a collation between each of a content A, a content B, a content C and a content D, and the other as shown in FIG. 2 is carried out, the time section partners shown with oblique striped lines, and the time section partners shown with vertical striped lines are grouped, respectively. The grouping information obtained in such a manner is outputted to the topicality determination means 102.

At the moment that the user selects and views the contents, the contents stored in the content storage means 105 are also inputted into the content viewing means 10. In the content viewing means 104, the user reproduces and views the contents. Simultaneously, the content viewing means 104 records the viewing history of the content. At this moment, with regard to the viewing history, the content viewing means 104 may record only whether the content has been reproduced, or when the user has not initiated the viewing at the beginning, the content viewing means 104 skips over the beginning part and records only the information of the actually reproduced location. Further, when the section in which content has been fast-forwarded exists, the content viewing means 104 records the above section information as well. The by-content viewing history information is outputted to the content viewing history storage means 106.

The viewing history information to be inputted is stored in the content viewing history storage means 106. This viewing history information as well may be dispersedly stored in a plurality of the storages similarly to the case of the content storage means 105. The viewing history information is inputted into the topicality determination means 102.

The topicality determination means 102 calculates the viewing frequency of each of the contents from the grouping information and the viewing history information. Herein, the topicality determination means 102 calculates the viewing history information content by content, and calculates a total viewing frequency by totaling the viewing histories within the group by use of the grouping information. And, the topicality determination means 102 determines the topicality of the content based upon this total viewing frequency, and outputs it as topicality information. The details of an operation of the topicality determination means 102 will be described later.

Next, an operation of the entirety of the content topicality determination system will be explained by employing a flowchart.

Figure 5:
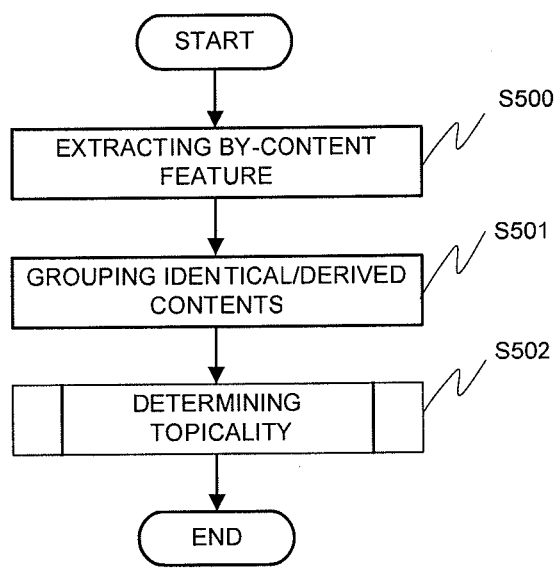
FIG. 5 is a flowchart illustrating an operation of the entirety of the content topicality determination system in this exemplary embodiment.

FIG. 5 is a flowchart representing a flow of the entirety of a process of the content topicality determination system in this exemplary embodiment shown in FIG. 1.

At first, in a step S500, the by-content feature is extracted. The details of the extraction are ones described in the feature extraction means 100. Next, in a step S501, the extracted features are collated in terms of the content, the contents are grouped, and the grouping information is obtained. The details of the grouping are ones described in the identical/derived content grouping means 101. And, in a step S502, the topicality of the content is determined by employing the grouping information and the viewing history information, and the topicality information is calculated.

Next, the exemplary embodiment of the topicality determination means 102 will be described in details.

Figure 3:
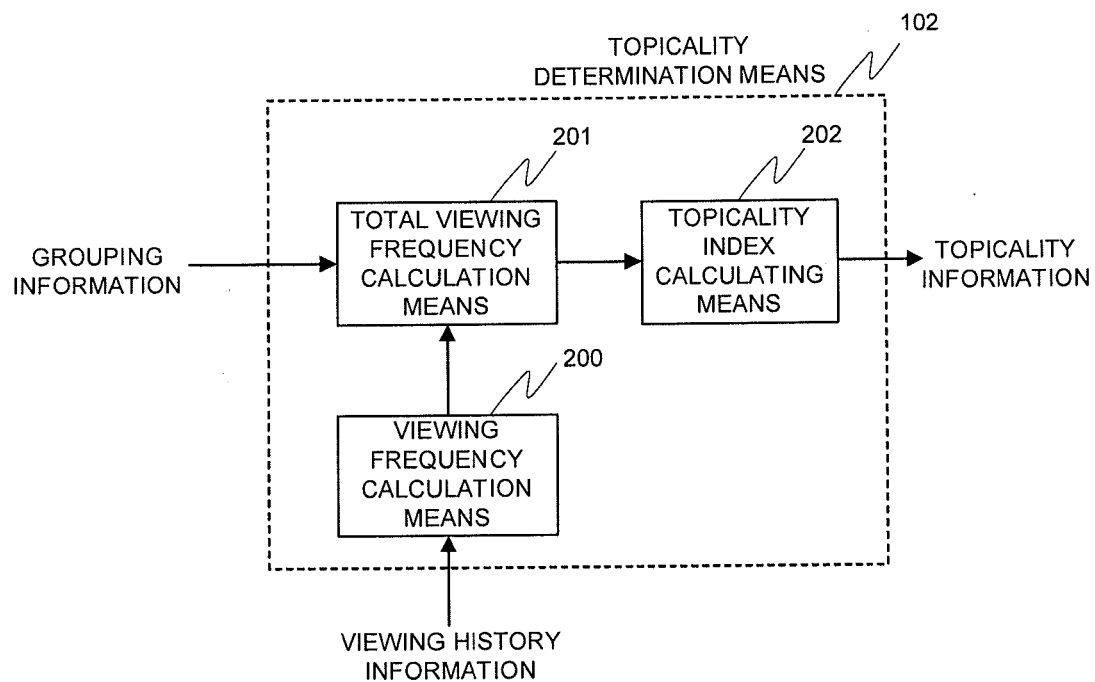
FIG. 3 is a block diagram illustrating the exemplary embodiment of a topicality determination means 102 of FIG. 1.

FIG. 3 is a view representing one exemplary embodiment of the topicality determination means 102.

FIG. 3 shows a configuration that is comprised of a viewing frequency calculation means 200, a total viewing frequency calculation means 201, and a topicality index calculation means 202. The viewing frequency calculation means 200, which has the viewing history information as an input, outputs the by-content viewing frequency information to the total viewing frequency calculation means 201. The total viewing frequency calculation means 201, which has the grouping information, and the viewing frequency information to be outputted from the viewing frequency calculation means 200 as an input, respectively, outputs the total viewing frequency to the topicality index calculation means 202. The topicality index calculation means 202, which has the total viewing frequency as an input, calculates and outputs the topicality information.

Next, an operation of the topicality determination means 102 of FIG. 3 will be explained.

At first, the viewing frequency calculation means 200 calculates the viewing frequencies of individual contents from the viewing history information. The obtained by-content viewing frequency information is outputted to the total viewing frequency calculation means 201.

The total viewing frequency calculation means 201 calculates the total viewing frequency, being a viewing frequency as the entirety of the grouped contents, by totaling the viewing frequencies of individual contents. On the other hand, with the case of the contents each having a time axis such as the video and the music, the total viewing frequency calculation means 201 calculates the total viewing frequency of the contents in terms of each time section (a section length is arbitrary).

For example, with the case of an example of FIG. 2, when it is assumed that the viewing frequencies of individual contents to be obtained in the viewing frequency calculation means 200 are not dependent upon the time, and are $N_A$, $N_B$, $N_C$, and $N_D$, respectively, the total viewing frequency of the part shown with the oblique lines becomes one shown by Equation 1, and the total viewing frequency of the part shown with the vertical striped lines becomes one shown by Equation 2.

$$N_A + N_B + N_C \quad \text{Equation 1}$$

$$N_A + N_B + N_C + N_D \quad \text{Equation 2}$$

On the other hand, in a case where the viewing frequencies of respective contents differs from each other time by time due to the partial reproduction of the content, when it is assumed that the viewing frequencies for media times (relative times measured from the heads of the contents) of a content A, a content B, a content C, and a content D are $N_A(t)$, $N_B(t)$, $N_C(t)$, and $N_D(t)$, respectively, the total viewing frequency of the part shown with the oblique lines becomes one shown by Equation 3, and the total viewing frequency of the part shown with the vertical striped lines becomes one shown by Equation 4.

$$N_A(t)+N_B(t)+N_C(t+t_1) \quad \text{Equation 3}$$

$$N_A(t)+N_B(t)+N_C(t+t_1)+N_D(t-t_3+t_2) \quad \text{Equation 4}$$

The total viewing frequency calculated in such a manner is outputted to the topicality index calculation means 202. Or, the viewing frequencies of the respective contents may be totaled by performing the weighting as to whether the content is an original content or a derived content. Or, the viewing frequencies of the respective contents may be totaled by adding a reliability of the site in which each content exists, and performing the weighting that is dependent upon the site. In this case, the total viewing frequency of the part shown with the oblique lines becomes one shown by Equation 5 when the viewing frequency is not dependent upon the time, and becomes one shown by Equation 6 when the viewing frequency is dependent upon the time. Where, each of $W_A$, $W_B$, and $W_C$ is a weighting factor.

$$W_A N_A + W_B N_B + W_C N_C \quad \text{Equation 5}$$

$$W_A N_A(t) + W_B N_B(t) + W_C N_C(t+t_1) \quad \text{Equation 6}$$

Additionally, the viewing frequency of the content of which the viewing time is nearer to the current time may be weighted more largely and calculated. For example, the control such that the weight of the viewing frequency of the content viewed today is 1, that of the viewing frequency of the content viewed k days ago is 1−k/N, and that of the viewing frequency of the content viewed N days ago is zero, namely that of the viewing frequency of the above content is not counted is thinkable. This allows the latest viewing frequency to be regarded as important, thereby making a possible to extract more seasonable and topical contents.

The topicality index calculation means 202 determines the topicality of the content or the by-time topicality of the content based upon the total viewing frequency. The simplest way is that it may be jugged that the larger the total, the larger the topicality. That is, the total viewing frequency can be employed as an index of the topicality as it stands.

Next, an operation of the topicality determination means 102 will be explained by using a flowchart.

Figure 6:
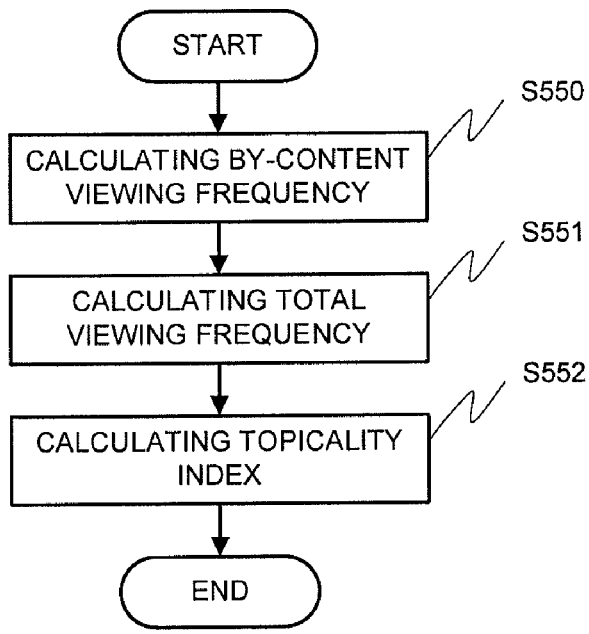
FIG. 6 is a flowchart illustrating an operation of the topicality determination means 102 shown in FIG. 3.

FIG. 6 is a flowchart of the entirety of the process of the topicality determination means 102 shown in FIG. 3.

At first, in a step S550, the viewing frequency is calculated for each content unit. Next, in a step S551, the viewing frequencies for each content unit are totaled in terms of the grouped content to calculate the total viewing frequency. Finally, in a step S552, the topicality index is calculated from the total viewing frequency, and outputted.

Next, another exemplary embodiment of the topicality determination means 102 will be described in details.

Figure 4:
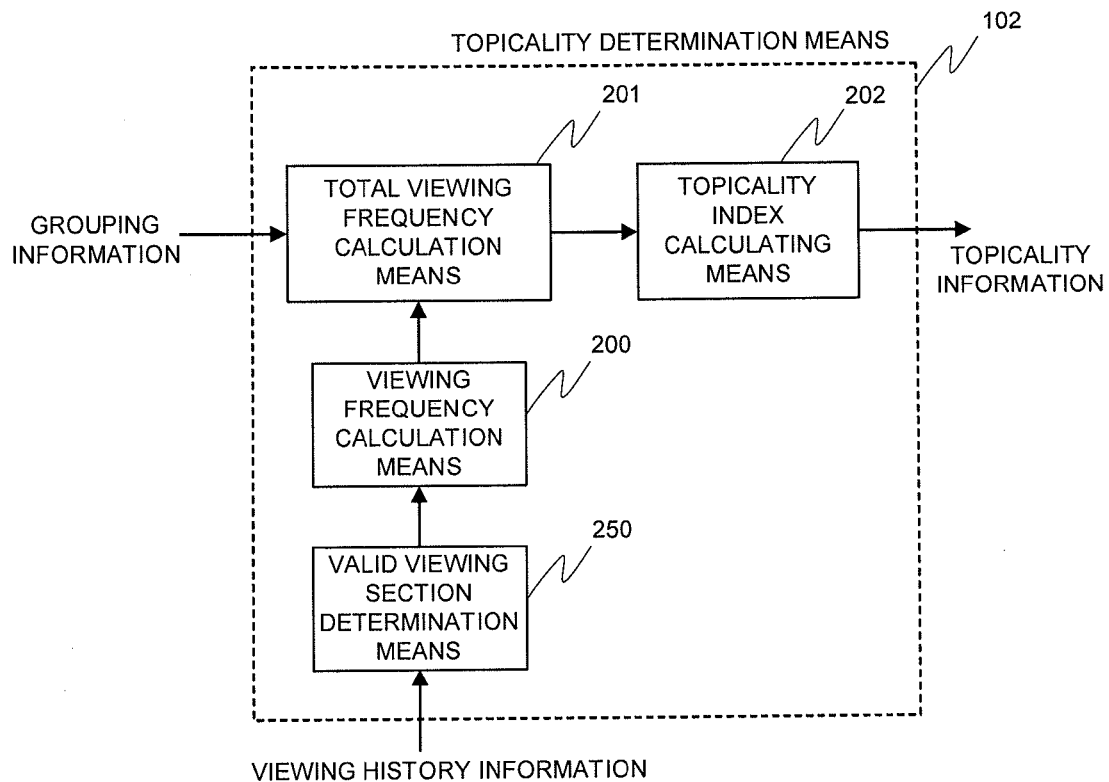
FIG. 4 is a block diagram illustrating another exemplary embodiment of the topicality determination means 102 of FIG. 1.

FIG. 4 is a view representing another exemplary embodiment of the topicality determination means 102.

FIG. 4 shows a configuration that is comprised of a viewing frequency calculation means 200, a total viewing frequency calculation means 201, a topicality index calculation means 202, and a valid viewing section determination means 250. An input into the valid viewing section determination means 250 is the viewing history information, and an output from it is inputted into the viewing frequency calculation means 200. A configuration other than it is similar to that of the topicality determination means 102 of FIG. 3.

Next, an operation of the topicality determination means 102 of FIG. 4 will be explained.

Operations of the viewing frequency calculation means 200, the total viewing frequency calculation means 201, and the topicality index calculation means 202 are similar to those of FIG. 3. Herein, an operation of the valid viewing section determination means 250 will be described.

The viewing history information is inputted into the valid viewing section determination means 250. The valid viewing section determination means 250 determines which history, out of the inputted viewing histories, is unsuitable for the viewing, and deletes the history determined to be unsuitable. For example, when the reproduction time of the content is very short, a possibility that it is not that the above content is viewed, but that the above content accidentally attracts an attention when it is selected by zapping is high. Or, the case of carrying out the special reproduction such as fast-forwarding also differs from the case of the normal viewing. Thus, these logs are excluded, and the remaining histories are outputted to the viewing frequency calculation means 200.

Figure 7:
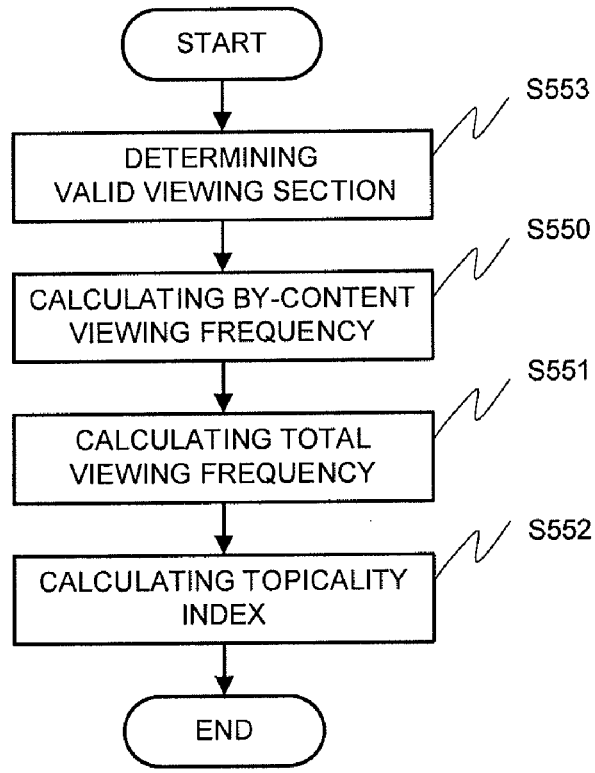
FIG. 7 is a flowchart illustrating an operation of the topicality determination means 102 shown in FIG. 4.

FIG. 7 is a flowchart of the entirety of the process of the topicality determination means 102 shown in FIG. 4.

Steps other than the step S553 of determining the valid viewing section listed in the first place are similar to those of a flowchart of FIG. 6. The step of determining the valid viewing section (step S553) determines which history, out of the inputted viewing histories, is unsuitable for the viewing, and deletes the history determined to be unsuitable. The determination subsequent hereto is similar to that of a flowchart of FIG. 6.

This exemplary embodiment makes it possible to precisely determine the topicality of a certain section of the content because a configuration is made so that the identical/derived contents are automatically found out from among a plurality of the contents, and grouped, and the topicality is determined by totaling the viewing frequencies within the group section by section.

The reason is that the video images are collated with each other for each section unit, and not only the identical contents, each of which has an different ID given, but also the contents, which can be produced by derivation of a certain content, can be grouped as contents each having identical details, thereby making it possible to evaluating the topicality for the above group by use of the entirety of the viewing frequencies of individual contents.

Additionally, while each part was configured with hardware in the above-mentioned exemplary embodiment, it may be configured with the information processing apparatus such as CPU that operates under a program. In this case, the program causes the information processing apparatus such as CPU to execute the above-described operation.

The first mode of the present invention is characterized in that a content topicality determination system comprising: a feature extraction means for extracting features of contents from a plurality of the contents; a content grouping means for collating the features of a plurality of the contents extracted by said feature extraction means with each other, obtaining the identical contents and the derived contents produced by using the above identical contents to be included in said plurality of the contents, grouping the identical/derived contents, and calculating identical/derived content grouping information; and a topicality determination means for totaling viewing frequencies of the contents determined to be the identical/derived contents from viewing history information of said plurality of the contents and said identical/derived content grouping information, calculating a total viewing frequency for each identical/derived content, and determining topicality of said identical/derived content based upon said total viewing frequency.

The second mode of the present invention, in the above-mentioned mode, is characterized in that said content has a time axis; wherein said content grouping means groups the identical/derived contents for each time section by said collation, and calculates said identical/derived content grouping information; and wherein said topicality determination means calculates said total viewing frequency for each time section, and determines the topicality for each time section.

The third mode of the present invention, in the above-mentioned mode, is characterized in that said content is music or video.

The fourth mode of the present invention, in the above-mentioned mode, is characterized in that said feature of the content includes at least one of a visual feature and an audio feature.

The fifth mode of the present invention, in the above-mentioned mode, is characterized in that said topicality determination means determines that the content of which said total viewing frequency is large is a topical content.

The sixth mode of the present invention, in the above-mentioned mode, is characterized in that said topicality determination means determines the topicality of the content by a time section.

The seventh mode of the present invention, in the above-mentioned mode, is characterized in that the topicality determination system comprising a content viewing means for selecting the content from among said plurality of the contents, viewing the content, and outputting identification information and a viewing section of the viewed content as said content viewing history information.

The eighth mode of the present invention, in the above-mentioned mode, is characterized in that said topicality determination means: comprises a valid viewing section determination means for determining only the history meeting a constant viewing condition to be valid from said content viewing history information; and calculates the total viewing frequency by using the section determined to be valid by said valid viewing section determination means.

The ninth mode of the present invention is characterized in that a content topicality determination method comprising: a feature extraction step of extracting features of contents from a plurality of the contents; a content grouping step of collating the features of said plurality of the extracted contents with each other, obtaining the identical contents and the derived contents produced by using the above identical contents to be included in said plurality of the contents, grouping the identical/derived contents, and calculating identical/derived content grouping information; and a topicality determination step of totaling viewing frequencies of the contents determined to be the identical/derived contents from viewing history information of said plurality of the contents and said identical/derived content grouping information, calculating a total viewing frequency for each identical/derived content, and determining topicality of said identical/derived content based upon said total viewing frequency.

The tenth mode of the present invention, in the above-mentioned mode, is characterized in that said content has a time axis; wherein said content grouping step groups the identical/derived contents for each time section by said collation, and calculates said identical/derived content grouping information; and wherein said topicality determination step calculates said total viewing frequency for each time section, and determines the topicality for each time section.

The eleventh mode of the present invention, in the above-mentioned mode, is characterized in that said content is music or video.

The twelfth mode of the present invention is characterized in that said feature of the content includes at least one of a visual feature and an audio feature.

The thirteenth mode of the present invention is characterized in that said topicality determination step determines that the content of which said total viewing frequency is large is a topical content.

The fourteenth mode of the present invention, in the above-mentioned mode, is characterized in that said topicality determination step determines the topicality of the content by a time section.

The fifteenth mode of the present invention, in the above-mentioned mode, is characterized in that the topicality determination method comprising a content viewing step of selecting the content from among said plurality of the contents, viewing the content, and outputting identification information and a viewing section of the viewed content as said content viewing history information.

The sixteenth mode of the present invention, in the above-mentioned mode, is characterized in that said topicality determination step: determines only the history meeting a constant viewing condition to be valid from said content viewing history information; and calculates the total viewing frequency by using said section determined to be valid.

The seventeenth mode of the present invention is characterized in that a content topicality determination program for causing an information processing apparatus to execute: a feature extraction process of extracting features of contents from a plurality of the contents; a content grouping process of collating the features of said plurality of the extracted contents with each other, obtaining the identical contents and the derived contents produced by using the above identical contents to be included in said plurality of the contents, grouping the identical/derived contents, and calculating identical/derived content grouping information; and a topicality determination process of totaling viewing frequencies of the contents determined to be the identical/derived contents from viewing history information of said plurality of the contents and said identical/derived content grouping information, calculating a total viewing frequency for each identical/derived content, and determining topicality of said identical/derived content based upon said total viewing frequency.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-167344, filed on Jun. 26, 2008, the disclosure of which is incorporated herein in its entirety by reference.

INDUSTRIAL APPLICABILITY

The present invention is applicable to a field of determining the topicality of the contents subscribed over the network section by section. Further, the foregoing field is not limited to the network, and the present invention is similarly applicable to the contents stored in an identical hard disc recorder so long as the identical/derived contents exist in it.

REFERENCE SIGNS LIST 100 feature extraction means
101 identical/derived content grouping means
102 topicality determination means
104 content viewing means
105 content storage means
106 content viewing history storage means
200 viewing frequency calculation means
201 total viewing frequency calculation means
202 topicality index calculating means
250 valid viewing section determination means

The invention claimed is:

1. A content topicality determination system comprising:
an information processing apparatus;
a feature extractor that inputs a plurality of the contents from a content storage, extracts features for each of said plurality of the contents;
a content grouping unit that collates the features of a plurality of the contents extracted by said feature extractor with each other, groups identical contents and derived contents produced by using the above identical contents to be included in said plurality of the contents, based on the result of said collation, and calculates identical/derived content grouping information; and
a topicality determination unit that inputs viewing frequencies of the contents from a content viewing history storage, totals viewing frequencies of the contents determined to be the identical/derived contents from said input viewing history information of said plurality of the contents and said identical/derived content grouping information, calculates a total viewing frequency for each identical/derived content, and determines topicality of said identical/derived content based upon said total viewing frequency.

2. A content topicality determination system according to claim 1:
wherein said content has a time axis;
wherein said content grouping unit groups the identical/derived temporal segments included in said plurality of the contents based on the result of said collation, and calculates said identical/derived content grouping information; and
wherein said topicality determination unit calculates said total viewing frequency for each of said identical/derived temporal segments, and determines the topicality for each of said identical/derived temporal segments.

3. A content topicality determination system according to claim 2, wherein said content is music or video.

4. A content topicality determination system according to claim 3, wherein said feature of the content includes at least one of a visual feature and an audio feature.

5. A content topicality determination system according to claim 1, wherein said topicality determination unit determines that the content of which said total viewing frequency is large is a topical content.

6. A content topicality determination system according to claim 5, wherein said topicality determination unit determines the topicality of the content by a temporal segment.

7. A content topicality determination system according to claim 1, comprising a content viewing unit that selects the content from among said plurality of the contents, views the content, and outputs identification information and a viewing segment of the viewed content as said content viewing history information.

8. A content topicality determination system according to claim 1, wherein said topicality determination unit:
comprises a valid viewing section determination unit for determines only the history meeting a constant viewing condition to be valid from said content viewing history information; and
calculates the total viewing frequency by using the section determined to be valid by said valid viewing section determination means.

9. A content topicality determination method by using a computer comprising:
a feature extraction step of inputting a plurality of contents from a content storage, extracting features for each of said plurality of the contents;
a content grouping step of collating the features of said plurality of the contents extracted by said feature extractor with each other, grouping identical contents and derived contents produced by using the above identical contents to be included in said plurality of the contents, based on the result of said collation, and calculating identical/derived content grouping information; and
a topicality determination step of inputting viewing frequencies of the contents from a content viewing history storage, totaling viewing frequencies of the contents determined to be the identical/derived contents from said input viewing history information of said plurality of the contents and said identical/derived content grouping information, calculating a total viewing frequency for each identical/derived content, and determining topicality of said identical/derived content based upon said total viewing frequency.

10. A content topicality determination method according to claim 9:
wherein said content has a time axis;
wherein said content grouping step groups identical/derived temporal segments included in said plurality of the contents based on the result of said collation, and calculates said identical/derived content grouping information; and
wherein said topicality determination step calculates said total viewing frequency for each of said identical/derived temporal segments, and determines the topicality for each of said identical/derived temporal segments.

11. A content topicality determination method according to claim 10, wherein said content is music or video.

12. A content topicality determination method according to claim 11, wherein said feature of the content includes at least one of a visual feature and an audio feature.

13. A content topicality determination method according to claim 9, wherein said topicality determination step determines that the content of which said total viewing frequency is large is a topical content.

14. A content topicality determination method according to claim 13, wherein said topicality determination step determines the topicality of the content by a temporal segment.

15. A content topicality determination method according to claim 9, comprising a content viewing step of that selecting the content from among said plurality of the contents, viewing the content, and outputting identification information and a viewing segment of the viewed content as said content viewing history information.

16. A content topicality determination method according to claim 9, wherein said topicality determination step:

determines only the history meeting a constant viewing condition to be valid from said content viewing history information; and calculates the total viewing frequency by using said section determined to be valid.

17. A non-transitory computer readable storage medium storing a content topicality determination program for causing an information processing apparatus to execute:

a feature extraction process of extracting features for each of said plurality of the contents;

a content grouping process of collating the features of said plurality of the contents extracted by said feature extractor with each other, grouping identical contents and the derived contents produced by using the above identical contents to be included in said plurality of the contents, based on the result of said collation, and calculating identical/derived content grouping information; and a topicality determination process of totaling viewing frequencies of the contents determined to be the identical/derived contents from viewing history information of said plurality of the contents and said identical/derived content grouping information, calculating a total viewing frequency for each identical/derived content, and determining topicality of said identical/derived content based upon said total viewing frequency.

* * * * *